United States Patent [19]
Knoll

[11] Patent Number: 5,145,406
[45] Date of Patent: Sep. 8, 1992

[54] ATTACHMENT UNIT FOR ATTACHING AND CONNECTING ELECTRICAL LINES

[75] Inventor: Rudolf Knoll, Berg, Fed. Rep. of Germany

[73] Assignee: Siemens Aktiengesellschaft, Munich, Fed. Rep. of Germany

[21] Appl. No.: 587,036

[22] Filed: Sep. 24, 1990

[30] Foreign Application Priority Data

Sep. 29, 1989 [EP] European Pat. Off. ............ 89118076

[51] Int. Cl.⁵ ............................................. H01R 9/24
[52] U.S. Cl. ................................... 439/532; 361/426
[58] Field of Search ............... 439/131, 709, 716, 719, 439/532; 361/426, 428, 429, 391; 379/329

[56] References Cited

U.S. PATENT DOCUMENTS

| | | | |
|---|---|---|---|
| 3,784,728 | 1/1974 | De Bortoli | 361/426 |
| 4,372,629 | 2/1983 | Propst et al. | 439/131 |
| 4,390,230 | 6/1983 | Knickerbocker | 439/532 |

FOREIGN PATENT DOCUMENTS

| | | | |
|---|---|---|---|
| 179750 | 4/1986 | European Pat. Off. | 379/329 |
| 1271792 | 7/1964 | Fed. Rep. of Germany | |
| 7440021 | 7/1976 | France | |

*Primary Examiner*—Neil Abrams
*Attorney, Agent, or Firm*—Hill, Van Santen, Steadman & Simpson

[57] ABSTRACT

An attachment unit for attaching and connecting electrical lines or cabling wherein the edge region of one side wall of a carrier part, preferably manufactured as an extruded profile, comprises a full-cylinder shape acting as a pivot point which the plug strips are plugged onto with cooperating, hollow-cylindrical cut-out portions. In the position of use, these plug strips are screwed to a screw channel of the carrier part formed in an opposite side wall of the carrier part via a corresponding fastening flange formed at an end of the plug strips. Also, cable and wiring channels are formed through the carrier part by the specific shaping of a side wall of the carrier part and partitions. Further screw channels present in the extruded profile of the carrier part make possible the fastening of a base plate and the fastening of carrier plates, or, respectively, webs that service wiring or cabling or serve for the acceptance of other assemblies. An alternate hollow-cylindrical cut-out portion is provided at the plug strip symmetrically vis-a-vis the position of the fastening flange. Plug strips having posts or terminals arranged above one another on opposite face sides of the plug strip can be employed since the plug strip, having strain-relieving connecting wires, can be turned over by 180 degrees and refastened, using the alternate cut-out portion, for processing of a respective other face side.

20 Claims, 1 Drawing Sheet

ATTACHMENT UNIT FOR ATTACHING AND CONNECTING ELECTRICAL LINES

BACKGROUND OF THE INVENTION

The invention is directed to an attachment unit comprising a carrier part having a bottom surface and side walls and of plug strips accepted by this carrier part for attaching and connecting incoming and outgoing electrical lines, particularly in distributors of telephone systems, whereby the carrier part is in turn detachably connectable to a base element.

Such plug strips that are generally fashioned oblong are usually secured to a corresponding frame at their ends with screws. The patching determined for the system is then enabled with the electrical lines to be connected thereto such as, for example, the system lines leading to the individual terminal equipment and the ongoing lines. A multitude of plug strips are usually attached to a rack, whereby a line connection is then also provided between individual strips. In the known embodiments, making the necessary wiring space available for the lines to be patched is problematical.

SUMMARY OF THE INVENTION

It is the object of the invention to create an attachment unit that is assembly-friendly and maintenance-friendly and, in particular, allows a simply manipulatable laying or, respectively, modification of the lines to be connected.

This is achieved in that the free edge of one side wall of the carrier part is continuously shaped such that, for the purpose of forming a hinge-like connection to the plug strip, it can be joined to a cooperating form fashioned at the plug strip and an at least partial, mutual embracing thereby ensues between the free edge and the plug strip; and such that the free edge of an opposite side wall of the carrier part is fashioned as a screw channel that, after a joining of the opposite side wall and the plug strip, accepts a shank of a screw element serving the purpose of a screw-type connection of the plug strip to the carrier part; and in that, as a result of the specific shaping of at least one side wall, an additional space suitable for the acceptance of the electrical lines arises, next to a space that is open at one side, and the additional space is defined by the two side walls of the carrier part.

In that the plug strips can at first have a side face placed onto the carrier part as a result of inter-engaging shaped elements or, respectively, cut-out portions adapted thereto, a simple fastening and manipulation derives on the basis of the pivotability thus achieved. The screw channel that proceeds continuously laterally, together with the simple plug-on of the plug strip to the opposite side of the carrier part, allows an arbitrary placing of the plug strip. Due to the round shape of the free edge of the one side wall needed for the hinge-like connection, no additional edge protection for line wires proceeding thereover is required. An adequate seating for the plug strip simultaneously occurs on the upper edge of the screw channel.

The simple attachment of the plug strip to the carrier part, in combination with the simple pivotability, enables the employment of plug strips wherein the post elements or terminal elements are arranged above one another. When two suitably placed cooperating shapes are provided at the corresponding side face of the plug strip, then the strip can again be fixed in an extremely simple way after reorienting or "turning over" the plug strip, by axial rotation of 180°. As a result thereof, the connecting of the electrical conductors becomes especially simple on the basis of the easy accessibility that is accordingly possible for every connection side.

Due to the wiring space formed by the specific shaping of the at least one side wall, the manual introduction of the electrical conductors is significantly facilitated. Moreover, the attachment unit is also very advantageously fashioned by the joining of a very low number of individual parts.

In a development of the invention, additional fastening elements that support the attachment unit and supporting elements for the electrical lines to be laid can be introduced into specific formed portions of the side walls and/or of the bottom surface of the carrier part. Such supporting elements, for example, are what are referred to as patching hooks that can then be plugged as needed onto the formed portions that are continuously present at the long side.

In a development of the invention, the carrier part is manufactured as a metallic extruded profile and the one free edge of the side wall for forming the hinge-like connection comprises a full-cylinder shape attached directly to the edge of the side wall of the carrier part, this full-cylinder shape engaging into an outwardly open, hollow-cylindrical shape that is fashioned as a cooperating shape at a lateral surface of this plug strip, the full-cylinder shape engaging thereinto when joined to the plug strip. A carrier part simple to manufacture is thus obtained that has the aforementioned multi-functionality and with which the length dimension that is respectively required is obtained by simply parting the carrier part.

After the joining of the shapes that form the hinge-like connection and after the corresponding alignment of the plug strip, this plug strip, in a development of the invention, has a flange attached to it provided with perforations and lays on an edge of the screw channel present at one lateral side. This then also enables the simple attachment for fastening grounding plates with which protected plugs of the plug strips are grounded via the carrier part.

It is provided that a respectively further hollow-cylindrical shape that is symmetrically arranged with respect to the position of the flange is present at that side face of the plug strip that comprises the first hollow-cylindrical shape. The plug strip can thus be re-secured in a simple way after the axial rotation by 180°. A plug strip wherein the terminal posts are arranged above one another in a space-saving and economical way can thus be unproblematically employed. One face side can thereby be exclusively allocated to the lines of the system side, i.e. the lines leading to the switching equipment, and a terminal face side lying thereopposite can be allocated to, for example, the lines leading to the subscribers that must be more frequently changed. In order to be able to undertake modifications in the wiring of a downwardly disposed connector side, the strip is then to be attached side-inverted in the described way for the respective processing.

A development of the invention provides that the one side wall of the carrier part is conducted to the side wall lying opposite it, and is partially inwardly offset relative to the bottom surface, so that the channel that is laterally open to the outside and serves the purpose of accepting electrical conductors is formed; and that, in alignment with the free edge, ribs suitable for the engagement of a patching hook that serves as a support element for the electrical lines to be guided are formed at the bottom surface and at the free edge itself.

In a development of the invention, the upper rib represents the outer wall of a channel open at one side that is fashioned immediately in the region of the edge comprising the full-cylinder shape. The lower outside surface of the channel is obliquely inwardly inclined and represents the catch face for a catch nose for a patching hook that is to be hooked in. Particularly, given a catch face formed with teeth in accord with the invention, the catch nose spreads firmly apart in this face upon attachment of the patching hook. The necessary, stable, anti-tilt seating of the patching hook is thus achieved. In a development, the catch face is inclined to a somewhat greater degree than the turning line of the catch nose. A wedging is thus achieved that is intensified by the both-sided toothing, and manufacturing tolerances in the two parts are compensated. The catch nose can be deflected with assistance of a simple tool, for example a screwdriver, so that a simple releasing of the patching hook is possible.

The structure of the inventive carrier part provides for additional fastening elements that promote the function of the attachment unit by dividing up the cross section of the extruded carrier part into wiring or cabling compartments or channels, and also support elements, such as the patching hooks for the wiring or cabling to be guided, are introducible into special formed portions of side walls and/or of the bottom surface of the carrier part.

An advantageous attachment of the patching clip or the patching hook that serves as a support element for electrical lines to be guided is provided by ribs formed in an alignment with the free edge of the side wall, the ribs formed at the free edge and at the bottom surface. An upper one of these ribs represents an outer wall of a channel open upwardly, that is fashioned immediately in the region of the free edge which comprises the full-cylinder shape. A lower outside surface of this channel is inclined obliquely inwardly and represents the catch face for the catch nose of the patching hook. Additionally, the bottom surface comprises screw channels at least in the aligning line to the upper, free edges of the side walls, and the lower rib provided for the engagement of the patching hooks represents an extension of one of the screw channel walls that points in the direction of the free edge of the side wall, adjacent to the patch hook.

The side wall and the bottom surface form an approximate U-shape, a last subsection of the side wall which leads to the free edge describes an obtuse angle with a leg of the U-shape, the obtuse angle lying in the inside region of the carrier part. The U-shape is open toward the left in FIG. 1. A screw channel is formed in a region of the transition of the side wall into a roof of the proximate U-shape, with webs or plates being capable of being screwed to the side wall via the screw channel.

A guide channel is provided proximately perpendicularly open in an inward direction formed on an inside of another side wall, a free edge region of the webs or plates being introduced into the guide channel. Thus the webs or plates are connected at one end to the screw channel and at another end are captured by the guide channel. Thus, a readily assemblable construction is provided.

After joining of the plug strip to the carrier part, a channel-like trough is formed under the plug strip. This channel-like trough could also be used to communicate wiring or cabling.

The invention shall be set forth in greater detail below with reference to an exemplary embodiment shown in the drawing.

DETAILED DESCRIPTION OF THE PREFERRED EMBODIMENTS

Figure 1:
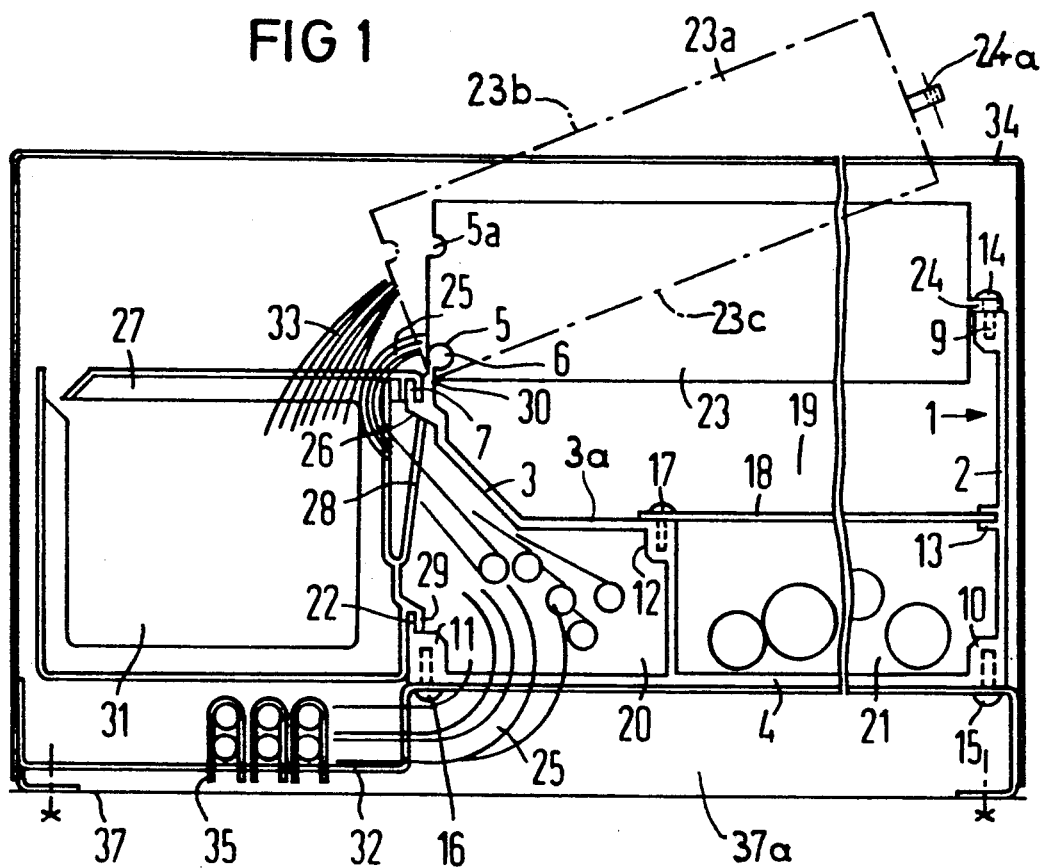
FIG. 1 is a sectional view of a completely equipped attachment unit.

FIG. 1 shows an attachment unit that is composed of a plug strip 23 and of a carrier part 1 that comprises a first side wall 2, a second side wall 3, and a bottom surface 4. A multitude of such plug strips 23 are joined in succession laterally (into the page of FIG. 1) of such a carrier part 1 for forming a distributor block. The plug strips of the exemplary embodiment are to be fashioned such that connector elements for incoming and outgoing lines are present both at their upper long face side 23b as well as at the lower long face side 23c lying thereopposite. For example, the patching wires 33 leading to the subscribers that are to be more frequently changed can thus be connected to the upper face 23b side which is to be viewed as being the servicing side. This, thus, is easily accessible, so that the necessary changes in the occupation of the strip can be unproblematically undertaken. The connector elements for the lines 25 that are at the system side, i.e. that lead to the switching equipment, and that are usually not to be changed should be present at the opposite long face side 23c.

The carrier part should be manufactured as an extruded profile, whereby an arbitrary length dimension or lateral dimension (into the page of FIG. 1) is then respectively acquired by simply cutting the "yard goods". A free edge of the second side wall 3 of the carrier part 1 has a full-cylinder shape 6 inclined slightly toward an inside of the carrier part 1. The plug strip 23, that is provided with a cut-out portion 5 adapted to the full-cylinder shape 6, is plugged onto this full-cylinder shape. The plug strip can then be moved hinge-like. This is indicated by the plug strip 23a shown with broken lines. A pivot point thus derives for simple fastening and manipulation.

The first side wall 2 of the carrier part 1 comprises a screw channel 9 at the free upper edge. This screw channel 9 as well as other screw channels described hereinafter can comprise elongated rails with axially disposed slots wherein a shank of a screw is grippingly held. The slots give locational flexibility for making a screw attachment, eliminating the need for precisely located screw receiving holes. After the plug strip 23 is moved onto the full-cylinder shape 6 of the second side wall 3 on the basis of the corresponding cut-out portions 5, a flange 24 attached to the plug strip is to be put in place on the edge of the screw channel 9 at an arbitrary location laterally of the carrier part (into the page). Given a corresponding perforation 24a of the flange 24, the plug strip can now be secured to the carrier part 1 at the screw channel 9 with a self-tapping screw.

A further cut-out portion 5a that is symmetrically arranged vis-a-vis the cut-out portion 5 with respect to the flange 24 is provided at the plug strip 23. As a result thereof, the plug strip can be turned by 180 for the respective processing, given the attachment of strain-relieving conductors, and can be secured in the described way by being simply plugged on and screwed down. Plug strips wherein the terminal elements are attached to opposite long face sides 23b, 23c, in a space-saving and economical fashion, can thus be unproblematically employed. The edge 6 fashioned as a full-cylinder shape additionally assures that no additional edge protection for conductors 25 conducted thereover is required, the full-cylinder shape being smooth with no sharp edges.

The second side wall 3 of the carrier part 1 is extended to the bottom surface 4 bent off in inward direction. A wiring space 20 results in which the electrical lines 25 are allocated, for example, to the system side. A holding and a contacting of the shielding cladding can be enabled for these lines 25 of the system size on the basis, for example, of metallic cable clips 35, as indicated. In the exemplary embodiment, an end region 3a of the second side wall 3 extended toward the bottom surface 4 is fashioned L-shaped in the extruded profile and it comprises a channel 12 at a corner of the L-shape. This channel 12 can be employed as a screw channel, so that a web or a plate 18 can be attached given the employment of appropriate, self-tapping screws 17. An opposite end region of such a web or of such a plate 18 can be introduced into a capture channel or guide channel 13 applied to the inside of the first side wall 2. A further space 19 and, respectively, a second wiring space 21 are formed divided by the web or plate 18. The web 18 or, respectively, the plate 18 can be used for fastening assemblies and lines arranged in the second wiring space 21, or lines allocated to an external side of the plate 18, such as lines in the further space 19, can thus also be reliably held. With or without the plate 18 a channel-like trough is formed under the plug strips 23, defined by the plug strips 23 and the carrier part 1.

Two further channels 10 and 11 are present in the extruded profile in the lateral end region of the bottom wall 4. These further channels 10 and 11 can likewise be employed as screw channels, so that a base plate 32 can be screwed to the carrier part 1 at an arbitrary location with the screws 15 or, respectively, 16. Such a base plate 32 is needed, for example, in order to produce a defined spacing between the distributor blocks and a wall surface 37. Among other things, incoming or outgoing cables can then be arranged in a wall spacing region 37a thereby defined. The through screw channels 10 or, respectively, 11 allow the attachment of such base plates 32 at any arbitrary lateral location.

In order to facilitate the guidance of patching wires 33 that are laid to the individual plug strips or between individual plug strips, what are referred to as patching hooks or patching clips 27 can be attached to the carrier part 1. In the exemplary embodiment, this ensues in the region of the outwardly open chamber 20. To this end, the extruded profile comprises ribs 7, 22 in the region of that edge of the side wall 3 fashioned as a full-cylinder shape 6 and in the region of the screw channel 11 at the bottom wall 4 respectively. The patching clips 27 have hooks 29, 30 arranged thereon which are plugged over the two ribs 7, 22, respectively.

A firm anti-tilt seat is required for such patching clips. In order to achieve this, a catch arm or a catch nose 28 is provided that swings readily with respect to the remaining portions of the patching clip 27 to engage catch face 26 that comprises a toothing 8 (shown in FIG. 2). The catch face 26 has a somewhat more pronounced slope than the imaginary turning line of the catch nose 28, or respectively the tangent line of the circumferential moving path of a free end of the catch nose, at a position of contact with the catch face 26. The resilient or flexible catch nose presses against the profile of the catch face 26. A mutual wedging is thus achieved, as a result whereof manufacturing tolerances of the catch nose 28 and of the profile are compensated in the catch face. Due to buckling strain, or spreading apart of the ribs 7 and 22, a firm seat of the patching clip 27 at the ribs 7, 22 is thus enabled at any arbitrary lateral location of the patching clip on the through ribs 7 and 22.

Figure 2:
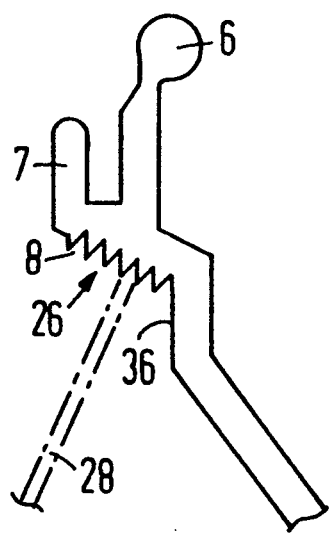
FIG. 2 is an enlarged sectional view of a fashioning of a free edge of a side wall shown in FIG. 1.

FIG. 2 shows the fashion of the free edge of the side wall 3 and the engagement of the catch nose 28 is indicated by the broken line. When a simple tool, introduced into the space between this edge 36 and the catch nose 28, is placed against the edge 36, for example a screwdriver, the patching hook can thus be unproblematically released by pressing the catch nose off.

The attachment unit comprising the carrier part 1 and of at least one plug strip 23 thus, as a self-varying unit, enables further functions in addition to enabling the extremely simple fastening of such an attachment unit. Cable and wiring channels, a simple catch fastening of patching clips 27 and the possibility of fastenings for plates or, respectively, webs 18 derive due to the multifunctionability of the extruded profile. At the same time, there is the possibility of screwing on clips or other built-in units or, respectively, base plates without requiring corresponding threads for screws, by using the screw channels. Following overall therefrom is a reduction of the manufacturing costs and, at the same time, a reduction of the space required for such a distributor block; at the same time, adequate space for the emplacement of patching lines is made available. The prefabrication of internal cables having an identical stripped length in the distributor and a corresponding contacting of the foil shield are thus guaranteed. It is possible in a simple way to cover the attachment unit with an appropriately adapted hood 34 of sheet metal or plastic. Other built-in units can also be attached instead of plug strips to the inventively fashioned carrier part 1.

Although various minor changes and modifications might be proposed by those skilled in the art, it will be understood that I wish to include within the claims of the patent warranted hereon all such changes and modifications as reasonably come within my contribution to the art.

I claim as my invention:

1. An attachment unit comprising: a carrier part having:
   a bottom surface,
   a first side wall including a first screw channel,
   a second side wall, said second side wall having a free edge portion having a first continuous cross sectional shape;
   at least one plug strip mounted to said carrier part for the attachment and connection of incoming and outgoing electrical lines, a first end of said plug strip fastened to said screw channel, a second end of said plug strip having a cooperating form which engages said first cross sectional shape forming a hinge-like connection of the plug strip to said second side wall, said continuous first cross sectional shape having a lateral length sufficient for arbitrary lateral placement of said plug strip at different positions along said length; and wherein at least one of said first and second side walls is shaped to form at least one space suitable for the acceptance of electrical lines, said space open at one side and defined by said one of said first and second side walls and said bottom surface.

2. An attachment unit comprising: a carrier part having:

a bottom surface, a first side wall including a first screw channel, a second side wall, said second side wall having a free edge portion having a first cross sectional shape;

at least one plug strip mounted to said carrier part for the attachment and connection of incoming and outgoing electrical lines, a first end of said plug strip fastened to said screw channel, a second end of said plug strip having a cooperating form which engages said first cross sectional shape forming a hinge-like connection of the plug strip to said second side wall; and wherein at least one of said first and second side walls is shaped to form at least one space suitable for the acceptance of electrical lines, said space open at one side and defined by said one of said first and second side walls and said bottom surface; and wherein said second side wall comprises a formed portion; and said attachment unit further comprises a means for guiding electrical lines which are connected at said plug strip, said means for guiding mounted to said formed portion.

3. An attachment unit according to claim 2, wherein said bottom surface comprises a second formed portion and said means for guiding is also mounted to said second formed portion.

4. An attachment unit according to claim 1, wherein said first cross sectional shape comprises a full-cylinder shape offset from adjoining portions of said second side wall, toward an inside of said carrier part, and said cooperating form of said plug strip comprises an outwardly open, hollow cylindrical shape, said hollow cylindrical shape plugably embracing said full cylinder shape to form said hinge-like connection.

5. An attachment unit according to claim 4, wherein said first end of said plug strip provides a flange, and wherein after said full cylinder shape is engaged to said outwardly open, hollow cylindrical shape, said flange aligns on said first screw channel of said first side wall, said flange provided with perforation for holding a screw, said screw engaging said first screw channel to fasten said flange to said first screw channel.

6. An attachment unit comprising: a carrier part having:

a bottom surface, a first side wall including a first screw channel, a second side wall, said second side wall having a free edge portion having a first cross sectional shape;

at least one plug strip mounted to said carrier part for the attachment and connection of incoming and outgoing electrical lines, a first end of said plug strip fastened to said screw channel, a second end of said plug strip having a cooperating form which engages said first cross sectional shape forming a hinge-like connection of the plug strip to said second side wall; and wherein at least one of said first and second side walls is shaped to form at least one space suitable for the acceptance of electrical lines, said space open at one side and defined by said one of said first and second side walls and said bottom surface;

wherein said first cross sectional shape comprises a full-cylinder shape offset from adjoining portions of said second side wall, toward an inside of said carrier part, and said cooperating form of said plug strip comprises an outwardly open, hollow cylindrical shape, said hollow cylindrical shape plugable embracing said full cylinder shape to form said hinge-like connection; and wherein said plug strip further comprises a second outwardly open, hollow-cylindrical shape that is symmetrically arranged with respect to a position of the flange, said second outwardly open, hollow-cylindrical shape is arranged on said second end of said plug strip and shaped to engage said full-cylinder shape, said second outwardly open, hollow cylindrical shape engageable with said full-cylinder shape with said flange aligning on said first screw channel when said plug strip is axially turned over.

7. An attachment unit comprising: a carrier part having:

a bottom surface, a first side wall including a first screw channel, a second side wall, said second side wall having a free edge portion having a first cross sectional shape;

at least one plug strip mounted to said carrier part for the attachment and connection of incoming and outgoing electrical lines, a first end of said plug strip fastened to said screw channel, a second end of said plug strip having a cooperating form which engages said first cross sectional shape forming a hinge-like connection of the plug strip to said second side wall;

wherein at least one of said first and second side walls is shaped to form at least one space suitable for the acceptance of electrical lines, said space open at one side and defined by said one of said first and second side walls and said bottom surface;

wherein said second side wall is extended toward said first side wall partially inwardly offset toward said bottom surface, forming said space; and said attachment unit further comprises a first rib and a second rib, said first rib formed on said free edge of said second side wall and said second rib formed on said bottom surface in alignment with said first rib; and said attachment unit further comprises at least one patching hook for supporting electrical lines to be guided, said patching hook mounted to said first and second ribs.

8. An attachment unit according to claim 7, wherein said second side wall comprises:

a free end portion comprising a full-cylinder shape at a distal end of said free end portion, and a channel portion formed inward of said full-cylinder shape, said first rib representing an outer wall of said channel portion, said channel portion open at one side, a lower outside surface of said channel portion is inclined obliquely inwardly toward said bottom surface, said lower outside surface having engagement means applied thereon; and said patching hook comprises a catch nose, said catch nose engages said engaging means applied to said lower outside surface to tightly engage said catch hook to said ribs.

9. An attachment unit according to claim 8, wherein said engagement means comprises teeth.

10. An attachment unit according to claim 9, wherein said lower outside surface is inclined at an angle intersecting the turning path of said catch nose.

11. An attachment unit according to claim 7, wherein said bottom surface comprises a second screw channel, wherein said second rib comprises an extension of one wall of said second screw channel pointing toward said first rib.

12. An attachment unit according to claim 1, wherein said second side wall and said bottom surface partially form an approximate U-shape, open laterally; and
said second side wall comprises an end section leading to said free edge, said end section bent off from said U-shape forming an obtuse angle in said second side wall.

13. An attachment unit comprising: a carrier part having:
a bottom surface,
a first side wall including a first screw channel,
a second side wall, said second side wall having a free edge portion having a first cross sectional shape;
at least one plug strip mounted to said carrier part for the attachment and connection of incoming and outgoing electrical lines, a first end of said plug strip fastened to said screw channel, a second end of said plug strip having a cooperating form which engages said first cross sectional shape forming a hinge-like connection of the plug strip to said second side wall; and
wherein at least one of said first and second side walls is shaped to form at least one space suitable for the acceptance of electrical lines, said space open at one side and defined by said one of said first and second side walls and said bottom surface;
wherein said second side wall and said bottom surface partially form an approximate U-shape, open laterally; and
said second side wall comprises an end section leading to said free edge, said end section bent off from said U-shape forming an obtuse angle in said second side wall; and
wherein said second side wall comprises:
a third screw channel formed in a region of a transition of said second side wall from a vertical side to a horizontal roof of said U-shape, said third screw channel providing attachment locations along its axis laterally arranged with respect to said carrier part; and
said attachment unit further comprises at least one plate for interacting with electrical lines residing inside said carrier part, said plate attached to said third screw channel of said second wall.

14. An attachment unit according to claim 13, wherein said at least one plate spans between said second wall and said first side wall, said first side wall providing a guide channel, laterally open, and formed thereon, for receiving said plate therein.

15. An attachment unit according to claim 14, wherein a channel-like trough is defined between said plug strip and said carrier part.

16. An attachment unit according to claim 15, wherein said channel-like trough is divided into two spaces by said plate.

17. An attachment unit comprising:
a carrier part having:
a bottom surface,
a first side wall including a first screw channel,
a second side wall, said second side wall having a free edge portion having a continuous first cross sectional shape; and
at least one plug strip mounted to said carrier part for the attachment and connection of incoming and outgoing electrical lines, a first end of said plug strip fastened to said screw channel, a second end of said plug strip having a cooperating form which engages said first cross sectional shape forming a hinge-like connection of the plug strip to said second side wall, said continuous first cross sectional shape having a lateral length sufficient for arbitrary lateral placement of said plug strip at different positions along said length.

18. An attachment unit according to claim 17, wherein said first cross sectional shape comprises a full-cylinder shape offset from adjoining portions of said second side wall, toward an inside of said carrier part, and said cooperating form of said plug strip comprises an outwardly open, hollow cylindrical shape, said hollow cylinder shape plugably embracing said full cylinder shape to form said hinge-like connection.

19. An attachment unit according to claim 18, wherein said first end of said plug strip provides a flange, and wherein after said full cylinder shape is engaged to said outwardly open, hollow cylindrical shape, said flange aligns on said first screw channel of said first side wall, said flange provided with perforations for holding a screw, said screw engaging said first screw channel to fasten said flange to said first screw channel.

20. An attachment unit comprising:
a carrier part having:
a bottom surface,
a first side wall including a first screw channel,
a second side wall, said second side wall having a free edge portion having a first cross sectional shape; and
at least one plug strip mounted to said carrier part for the attachment and connection of incoming and outgoing electrical lines, a first end of said plug strip fastened to said screw channel, a second end of said plug strip having a cooperating form which engages said first cross-sectional shape firming a hinge-like connection of the plug strip to said second side wall;
wherein said first cross sectional shape comprises a full-cylinder shape offset from adjoining portions of said second side wall, toward an inside of said carrier part, and said cooperating form of said plug strip comprises an outwardly open, hollow cylindrical shape, said hollow cylindrical shape plugably embracing said full cylinder shape to form said hinge-like connection;
wherein after said full cylinder shape is engaged to said outwardly open, hollow cylindrical shape, said flange aligns on said first screw channel of said first side wall, said flange provided with a perforation for holding a screw, said screw engaging said first screw channel to fasten said flange to said first screw channel; and
wherein said plug strip further comprises a second outwardly open, hollow-cylindrical shape that is symmetrically arranged with respect to a position of the flange, said second outwardly open, hollow-cylindrical shape is arranged on said second end of said plug strip and shaped to engage said full-cylinder shape, said second outwardly open, hollow cylindrical shape engageable with said full-cylinder shape with said flange aligning on said first screw channel when said plug strip is axially turned over.

* * * * *